United States Patent
Harris et al.

(10) Patent No.: US 9,940,162 B2
(45) Date of Patent: Apr. 10, 2018

(54) REALTIME OPTIMIZATION OF COMPUTE INFRASTRUCTURE IN A VIRTUALIZED ENVIRONMENT

(71) Applicant: Cycle Computing, LLC, Greenwich, CT (US)

(72) Inventors: Daniel Harris, New Haven, CT (US); Adrian Johnson, Oakland, CA (US); Jason A. Stowe, Greenwich, CT (US); Ben Watrous, Greenwich, CT (US)

(73) Assignee: CYCLE COMPUTING, LLC, Greenwich, NY (US)

( * ) Notice: Subject to any disclaimer, the term of this patent is extended or adjusted under 35 U.S.C. 154(b) by 0 days.

(21) Appl. No.: 14/432,135

(22) PCT Filed: Sep. 27, 2013

(86) PCT No.: PCT/US2013/062328
§ 371 (c)(1),
(2) Date: Mar. 27, 2015

(87) PCT Pub. No.: WO2014/052843
PCT Pub. Date: Apr. 3, 2014

(65) Prior Publication Data
US 2015/0242234 A1    Aug. 27, 2015

Related U.S. Application Data

(60) Provisional application No. 61/707,564, filed on Sep. 28, 2012.

(51) Int. Cl.
*G06F 9/455* (2006.01)
*G06F 9/46* (2006.01)
(Continued)

(52) U.S. Cl.
CPC ............ *G06F 9/4843* (2013.01); *G06F 9/455* (2013.01); *G06F 9/45533* (2013.01);
(Continued)

(58) Field of Classification Search
None
See application file for complete search history.

(56) References Cited

U.S. PATENT DOCUMENTS

| 8,346,921 | B1 | 1/2013 | Goodspeed et al. |
| 8,656,002 | B1 * | 2/2014 | Adogla ................... G06F 9/485 |
| | | | 709/201 |

(Continued)

FOREIGN PATENT DOCUMENTS

| JP | 2007293603 | 11/2007 |
| WO | 2011-044319 A1 | 4/2011 |

OTHER PUBLICATIONS

International Search Report and Written Opinion of the International Searching Authority in corresponding PCT Application No. PCT/US2013/062328, dated Jan. 27, 2014 (9 pages).
(Continued)

*Primary Examiner* — Charles M Swift
(74) *Attorney, Agent, or Firm* — Workman Nydegger

(57) ABSTRACT

A system and method is provided to dynamically optimize the topography of a compute cluster in real time based on the runtime configuration, specified as metadata, of jobs in a queuing or scheduling environment. The system provisions or terminates multiple types of virtualized resources based on the profile of all applications of the jobs in a current queue based on their aggregate runtime configuration specified as requirements and rank expressions within associated metadata. The system will continually request and terminate compute resources as jobs enter and exit the queue, keeping the cluster as minimal as possible while still being optimized
(Continued)

to complete all jobs in the queue, optimized for cost, runtime or other metric. End users can specify the runtime requirements of jobs, thereby preventing the user from having to know about the physical profile of the compute cluster to specifically architect their jobs.

20 Claims, 4 Drawing Sheets

(51) Int. Cl.
   *G06F 15/173*   (2006.01)
   *G06F 9/48*    (2006.01)
   *G06F 9/50*    (2006.01)
(52) U.S. Cl.
   CPC .......... *G06F 9/45558* (2013.01); *G06F 9/466* (2013.01); *G06F 9/48* (2013.01); *G06F 9/485* (2013.01); *G06F 9/4806* (2013.01); *G06F 9/4856* (2013.01); *G06F 9/4868* (2013.01); *G06F 9/4881* (2013.01); *G06F 9/50* (2013.01); *G06F 9/5005* (2013.01); *G06F 9/5011* (2013.01); *G06F 9/5022* (2013.01); *G06F 9/5027* (2013.01); *G06F 9/5044* (2013.01); *G06F 9/5055* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06F 2009/4557* (2013.01); *G06F 2009/45562* (2013.01); *G06F 2209/5022* (2013.01)

(56) References Cited

U.S. PATENT DOCUMENTS

| | | | |
|---|---|---|---|
| 8,954,586 B2* | 2/2015 | Anderson | G06F 9/5077 709/226 |
| 2006/0037021 A1* | 2/2006 | Anand | G06F 9/4881 718/102 |
| 2006/0143617 A1 | 6/2006 | Knauerhase et al. | |
| 2007/0143765 A1 | 6/2007 | Aridor et al. | |
| 2008/0059610 A1 | 3/2008 | Lin et al. | |
| 2011/0138055 A1* | 6/2011 | Daly | G06F 9/505 709/226 |
| 2011/0161964 A1* | 6/2011 | Piazza | G06F 9/4881 718/102 |
| 2011/0167421 A1* | 7/2011 | Soundararajan | G06F 9/5077 718/1 |
| 2012/0030685 A1 | 2/2012 | Jackson | |
| 2012/0060171 A1 | 3/2012 | Bobroff et al. | |
| 2012/0072762 A1 | 3/2012 | Atchison et al. | |
| 2012/0096468 A1* | 4/2012 | Chakravorty | G06F 9/50 718/103 |
| 2012/0096470 A1* | 4/2012 | Bartfai-Walcott | G06F 9/5072 718/103 |
| 2012/0096473 A1* | 4/2012 | Durham | G06F 9/5077 718/105 |
| 2012/0144394 A1* | 6/2012 | Prabhakar | G06F 9/4893 718/102 |
| 2012/0151358 A1 | 6/2012 | Joanny et al. | |
| 2012/0204176 A1* | 8/2012 | Tian | G06F 9/505 718/1 |
| 2012/0324112 A1* | 12/2012 | Dow | G06F 9/5077 709/226 |
| 2013/0019016 A1* | 1/2013 | Anderson | G06F 9/5077 709/226 |
| 2013/0060933 A1* | 3/2013 | Tung | G06F 11/3495 709/224 |
| 2013/0091284 A1* | 4/2013 | Rothschild | G06F 3/067 709/226 |
| 2013/0111032 A1* | 5/2013 | Alapati | G06F 9/5072 709/226 |
| 2013/0179289 A1* | 7/2013 | Calder | G06Q 30/08 705/26.3 |
| 2013/0179895 A1* | 7/2013 | Calder | G06F 9/5077 718/104 |
| 2013/0191843 A1* | 7/2013 | Sarkar | G06F 9/5066 718/105 |
| 2013/0268672 A1* | 10/2013 | Justafort | H04L 67/10 709/226 |
| 2013/0304899 A1* | 11/2013 | Winkler | H04L 67/34 709/224 |
| 2013/0332927 A1* | 12/2013 | Tang | G06F 9/45545 718/1 |
| 2014/0074965 A1* | 3/2014 | Xu | G06F 9/4856 709/217 |
| 2014/0173620 A1* | 6/2014 | Chai | G06F 9/5005 718/104 |
| 2014/0215467 A1* | 7/2014 | Niesser | G06F 9/45558 718/1 |

OTHER PUBLICATIONS

Notice for Reasons of Rejection in JP Application No. 2015-534760; English translation provided by Yousen Patent Attorneys & Assoc. (10 pages) Drafting Date Apr. 20, 2016.
D1: Utilizing PaaS in Business Systems—Making the Most of Automatic Scale Out, Nikkei Computer, vol. 804 (Mar. 15, 2012), pp. 102-105, Nikkei Business Publications, Inc., Japan.
European Search Report dated Jul. 14, 2016 (10 pages).

* cited by examiner

REALTIME OPTIMIZATION OF COMPUTE INFRASTRUCTURE IN A VIRTUALIZED ENVIRONMENT

BACKGROUND OF THE INVENTION

Technical Field

The present disclosure relates to virtualized compute infrastructure in both public, private and hybrid public-private environments, and to a method and system for the automatic, realtime, optimization of that virtualized compute infrastructure based on characteristics of the jobs intended to run within the environment.

Description of Related Art

Cloud based resources are typically virtualized compute environments in which a series a physical servers are provisioned into one or more virtual servers available for temporary use, each utilizing a subset of the total resources of a physical machine. When using one or more infrastructure-as-a-service (IaaS) provider(s), the user typically has control over the desired configuration of the virtualized infrastructure. Examples of this control may include the ability to choose virtual hardware from a list of predetermined configurations or the ability to specify the exact resources required for the desired virtualized hardware configuration. Cloud-based computational infrastructure typically has different pricing points based on the resources provided by the different virtualized machine types: the more resources provided, the higher the cost per unit of time.

Traditional compute environments are typically of fixed size and limited heterogeneity due to being based on limited hardware configurations at the time of purchase. The result being that the machines may or may not be capable of performing the work a job requires due to platform incompatibilities, disk space, memory or other limiting factors such as network interconnect. Conversely, it is also possible that a job running on a single machine underutilizes the machine resulting in wasted resources.

Current auto-scaling compute resources for an application, such as shown in U.S. Pat. No. 8,346,921, are focused on predictive auto-scaling based upon historical usage, of a single virtual machine configuration in terms of RAM, number of CPUs, etc., or instance type, ignoring situations where many applications are submitted to a compute environment, each requiring their own optimal VM (virtual machine) configuration or multiple VM configuration.

Similar current cloud based solutions, such as CycleCloud, provision virtualized hardware based on the number of idle jobs in a queuing, messaging, or batch scheduling system such as Condor or GridEngine. These solutions require the virtualized configuration of the execution nodes used to run the jobs be determined ahead of time and then automatically provision virtual machines matching this one configuration to execute idle jobs in the queue, message bus, or scheduler. This often results in the need to define a virtual machine configuration capable of running any job in a workflow, the least common multiple machine configuration for all the jobs, even if this configuration has excess resources needed by the majority of the jobs.

It is desirable to leverage the modern, virtualized compute environment's ability to specify different hardware configurations in realtime such that automatic provisioning of infrastructure can be based on the specific needs and characteristics of each job in a queue of jobs. Optimizing the type of virtual instance created by using metadata from queued jobs would allow jobs to complete faster, cheaper, and with fewer errors. This invention describes such a method and system.

SUMMARY OF THE INVENTION

The present system provides a requirements engine to make informed decisions on how to automatically optimize compute infrastructure based on job execution requirements in real time. In addition to the requirements engine, the system provides a storage mechanism for job metadata that captures the runtime requirements of different software applications that jobs may use or the characteristics of specific jobs in the queue if they are known at submission time. The metadata stored by the system contains a logical expression describing the environment the job requires in order to execute properly, which may contain any measurable property of a virtualized server, or plurality of servers, such as, but not limited to, any of the following metrics:

Aggregate CPU performance;
Available number of CPUs;
Available maximum memory;
Available maximum disk space;
Aggregate disk performance;
Aggregate network bandwidth;
Base operating system;
Additional required software configuration;
Maximum cost per hour for IaaS provisioned hardware;
Geographic location of physical hardware;
Scheduling system queue that the job is placed in;
Jurisdiction of physical hardware (e.g. can't run on servers governed by the Patriot Act); and
Name of the one or more IaaS provider(s) to potentially use.

An example of a logical expression using some of the above properties to describe a job requiring at least four CPUs and at least two gigabytes of RAM may look like the following:

CPUCount>4 && Memory>2G

An example of a set of logical expressions using some of the above properties to describe a job requiring at multiple machines, one with at least four CPUs and at least two gigabytes of RAM and another with 8 CPUs and a 8 GB of RAM, may look like the following:

["CPUCount>4 && Memory>2G", "CPUCount>8 && Memory>8G"]

The logical expression may also just be a type of virtual machine configuration required to execute the job, such as 'm1.small', or a set of nodes that are required to execute the job: ["m1.small", "c1.xlarge", "m1.xlarge"].

The requirements engine processes the metadata for each job in the queue in realtime and determines the optimal virtualized machine configuration for the job to be executed on based on the requirements specified in the metadata. Optionally, this process can be a direct mapping from the queue name the job is in to a type of configuration of virtual machine or machines that are created for those jobs. As more jobs are added to the queue, the system continues to process the metadata associated with each idle job, provisioning additional virtualized machines, either a single machine or resource per job or multiple resources per job, with each resource optimized to the unique runtime requirements of each job.

In addition to starting and stopping nodes based on idle jobs in a queue or scheduling system, the requirements engine will make new provisioning decisions based on what virtual instances have already been provisioned and started;

starting additional instances only when the backlog of work for current instances passes some user-defined threshold. When determining the hardware requirements of a job based on its metadata, the system will inspect previously provisioned hardware that has completed or is near completing any job(s) it was initially assigned, to determine if the hardware is suitable for running a currently idle job. In the case the hardware can be re-used, the system will not provision a new virtual machine and instead let the job be assigned to the idle or nearing idle node.

Furthermore, the requirements engine can, if requested by the user, terminate any virtual machines that were previously provisioned to run jobs that have now completed are standing unused in the pool of machines. In most IaaS environments, rented virtual machines are billed at specific time intervals, typically each hour from the time the machine was provisioned. The proposed system has the ability track this billing interval for each instance it starts, ensuring that an idle virtual machine is terminated prior to the next billing period. Terminating a virtual machine when it is no longer running the jobs and has no jobs that require it in the queue will reduce the overall cost in IaaS cloud environment as well as keeping the cluster topography minimized over the lifespan of the compute environment.

The algorithm the requirements engine provides to determine the hardware required to run a job can also be extended to not only include minimal requirements to run the job, but also preferential metrics that are not required to run the job, resulting in a dynamic ranking system against available virtual machine configurations. For example: the metadata describing a job might describe a system where the job only requires two gigabytes of memory to run, but it prefers more memory if available and when given the choice between a virtualized machine with two and four gigabytes of RAM, the one with more RAM should be ranked higher when deciding which machine to provision.

BRIEF DESCRIPTION OF THE DRAWING FIGURES

DETAILED DESCRIPTION OF THE INVENTION

A preferred embodiment of a process and system according to the invention will be described, but the invention is not limited to this embodiment.

It is understood the virtual machine configuration, or instance/node type, required to run a job may be a single processor on a machine time, multiple processors, or multiple virtual machines of varying types.

In the preferred embodiment, the requirements engine looks an individual job queue or a plurality of job queues in a scheduler or messaging middleware, including but not limited to Condor, GridEngine, Platform LSF, Platform Symphony, AMQP queues, MQ series, AWS SQS, as examples, calculating the required infrastructure for the tasks, or jobs, in those queues, and starting up an new infrastructure required based upon the difference between the current, expected, and ideal number of virtual machines of various configurations.

Figure 1:
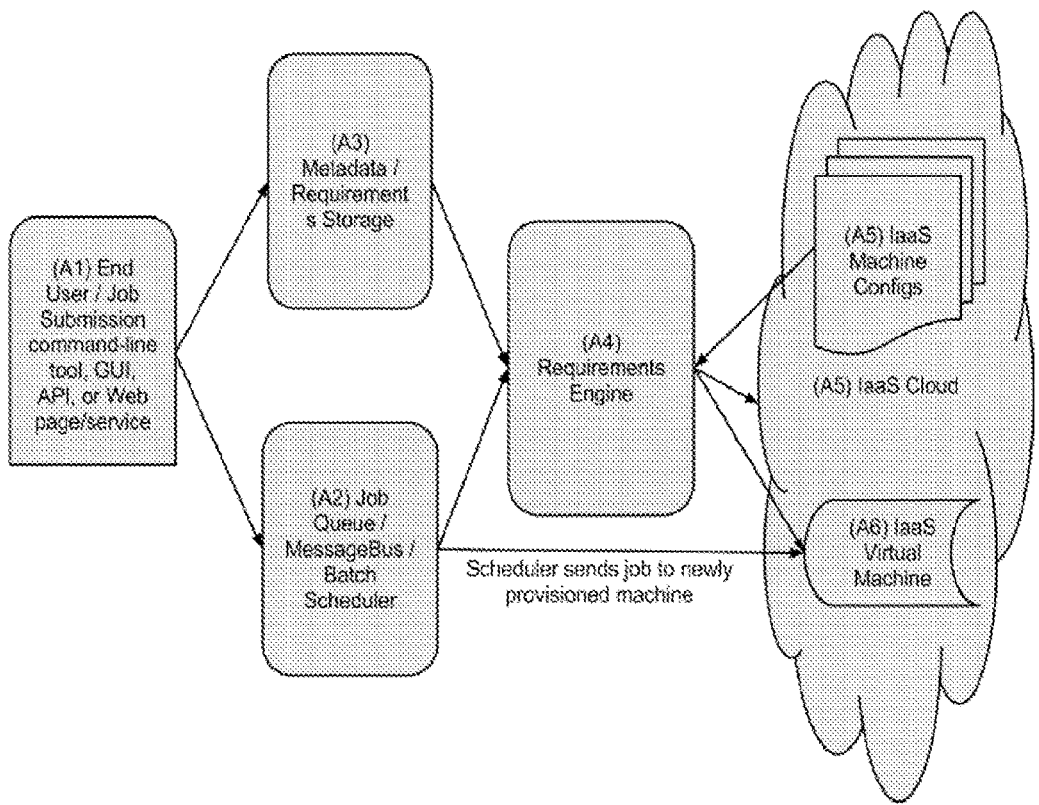
FIG. 1 is a block diagram which shows the process of both a job and accompanying metadata submission by an end user or job submission portal, command-line tool, API, or web page/service, such as but not limited to CycleServer, shell commands, or RESTful APIs, along with the requirements engine determining a matching virtual machine configuration from one or more IaaS provider(s).

Referring to FIG. 1, the block diagram shows the process of both a job and accompanying metadata submission by an end user or job submission portal, such as CycleServer, along with the requirements engine determining a matching virtual machine configuration from one or more IaaS provider(s).

The processes and components in this system are:
The end user or submission portal, command-lines, APIs, or web page/service (A1) generates and submits job for the queue/batch scheduler (A2) in addition to generating and storing metadata describing the logical requirements of the job in the metadata storage system (A3).
This causes the requirements engine (A4) to find idle jobs in the queue/scheduling system (A2) and matching metadata (A3).
The requirements engine interacts with one or more IaaS provider(s) (A5) to determine the available virtual machine configurations (A5).
The requirements engine (A4) chooses a virtual configuration from the list above (A5) which matches all of the logical requirements defined in the metadata (A3) and provisions a new virtual machine (A6), on which the jobs (A2) execute.

Figure 2:
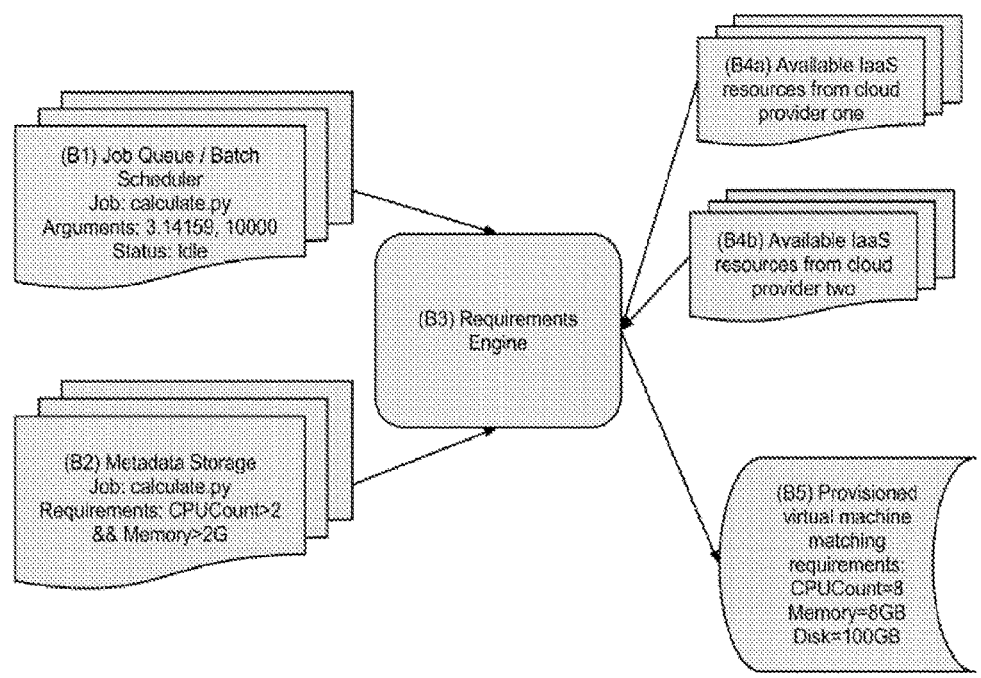
FIG. 2 is a block diagram which shows the requirements engine and the variables that can drive the algorithm which determines which of the available virtualized hardware to provision.

FIG. 2 is a block diagram which shows the requirements engine and the variables that can drive the algorithm which determines which of the available virtualized hardware to provision.

The processes and components in this system are:
The job queue/batch scheduler containing jobs that have yet to be completed (B1) while the metadata storage contains matching requirements for each job in the queue (B2).
The requirements engine (B3) stores the metrics of each available virtual machine able to be provisioned by one or more IaaS provider(s) (B4a & B4b).
The requirements engine algorithm determines the matching virtual machine configuration (B5) to the requirements in the job metadata (B2), provisioning the matching configuration on the proper IaaS provider to run the job.

Figure 3:
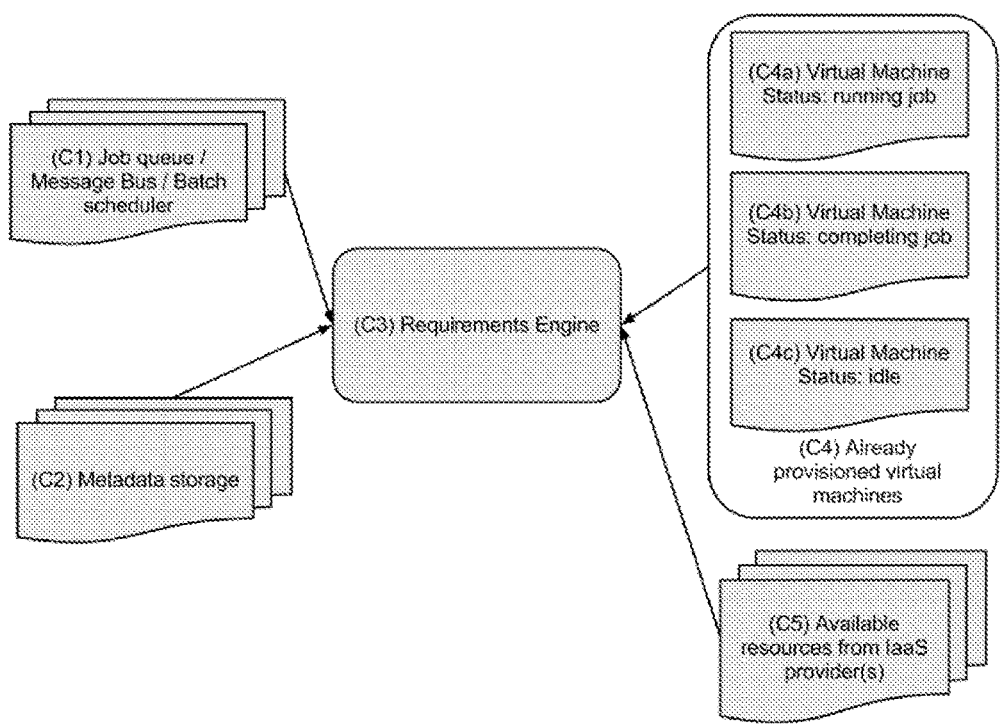
FIG. 3 is a block diagram showing the matching of an idle job and the metadata associated with the job to a previously provisioned set of virtual machines that have either completed or are near completion of their jobs.

FIG. 3 is a block diagram showing the matching of an idle job and the job's associated metadata to a previously provisioned set of virtual machines that have either completed or are near completion of their jobs.

The processes and components in this system are:
The job queue/batch scheduler containing jobs that have yet to be completed (C1) along with the metadata storage containing matching requirements for each idle job (C2).
These are fed into the requirements engine (C3) which processes both the list of available machine configurations from one or more IaaS provider(s) (C5) in addition to the configurations of all currently provisioned virtual machines (C6).

If a job in the queue (C1) can be run on an already provisioned instance that is idle or about to become idle (C3b/C4c) a new virtual machine is not provisioned and the job is allowed to run on already provisioned hardware which matches the requirements specified in the job metadata.

Figure 4:
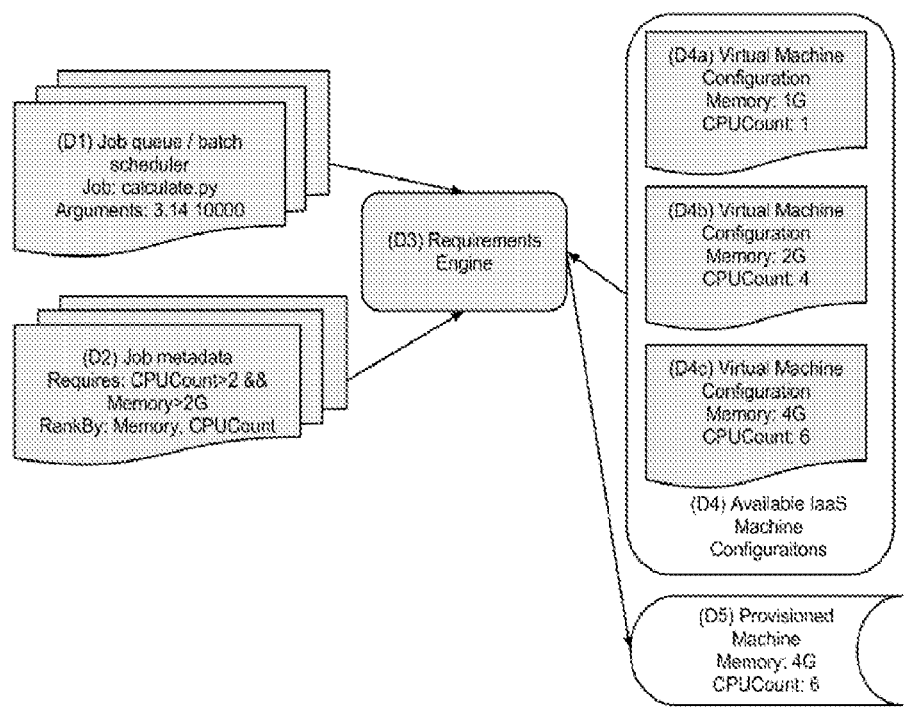
FIG. 4 is a block diagram showing the matching of an idle job, using the metadata associated with the job, to a virtual machine based on both a minimum requirements expression as well a ranking expression used to determine the preference when multiple machine configurations match the requirements.

FIG. 4 is a block diagram showing the matching of an idle job using it's associated metadata to a virtual machine based on both a minimum requirements expression as well a ranking expression used to determine the preference when multiple machine configurations match the requirements.

The processes and components in this system are:

The job queue/batch scheduler containing jobs that have yet to be completed (D1) along with the metadata storage containing machine requirements for idle jobs (D2)

These are fed into the requirements engine (D3) which stores a list of available machine configurations from one or more IaaS provider(s) (D4).

The requirements engine (D3) finds matching configurations (D4b & D4c) for the job (D1) using metadata (D2).

The requirements engine ranks each of the matching configurations (D4b & D4c) according to the ranking expression defined in the metadata.

A machine is provisioned (D5) based on the highest ranked matching configuration (D4c) according to the job metadata (D2).

A system and method is provided for any party utilizing a virtualized compute cloud environment, including the providers of such environments, to dynamically optimize the topography of a compute cluster in real time based on the runtime configuration, specified as metadata, of jobs in a queuing or scheduling environment. The system provisions or terminates multiple types of virtualized resources in the cloud based on the profile of all applications of the jobs in a current queue based on their aggregate runtime configuration specified as requirements and rank expressions within associated metadata. The system will continually request and terminate compute resources as jobs enter and exit the queue, keeping the cluster as minimal as possible while still being optimized to complete all jobs in the queue, optimized for cost, runtime or other metric. The system provides a way for end users to specify the runtime requirements of their jobs, preventing them from having to know about the physical profile of the compute cluster to specifically architect their jobs to the system they have to run on.

While the invention has been particularly shown and described with reference to a preferred embodiment thereof, it will be understood by those skilled in the art that various changes in form and detail may be made to it without departing from the spirit and scope of the invention.

The invention claimed is:

1. A method, implemented at a computer system including one or more processors, for optimized provisioning of virtual machines, the method comprising:
identifying a plurality of jobs that are currently being processed by a virtualized compute infrastructure that includes one or more virtualized computing providers, the virtualized compute infrastructure comprising a plurality of currently provisioned virtual machines;
identifying, within a queue, a plurality of jobs to be processed by the virtualized compute infrastructure;
for each of at least one of the plurality of jobs within the queue, performing at least the following:
  processing metadata associated with the at least one queued job, the metadata comprising logical data describing processing requirements of the at least one queued job;
  based at least partially on the processed metadata, selecting at least one virtual machine to be used for processing the at least one job, selecting the at least one virtual machine comprising at least:
    analyzing configuration types of one or more available virtual machines associated with at least one of the one or more virtualized computing providers to identify each available virtual machine that meets the processing requirements of the at least one queued job, the one or more available virtual machines not currently being provisioned for processing jobs;
    analyzing the plurality of currently provisioned virtual machines to identify each currently provisioned virtual machine that both meets the processing requirements of the at least one queued job and is idle or will soon be idle; and
    selecting the at least one virtual machine to be used for processing the at least one job from the one or more available virtual machines associated with at least one of the one or more virtualized computing providers and the currently provisioned virtual machines that meet the requirements of the at least one queued job and are idle or will soon be idle; and
provisioning the at least one selected virtual machine for processing of the at least one queued job.

2. The method of claim 1, wherein the metadata associated with the at least one selected virtual machine includes minimum requirements for the at least one queued job.

3. The method of claim 1, wherein the at least one selected virtual machine includes preferential requirements for the at least one queued job.

4. The method of claim 1, further comprising providing additional virtualized machines in response to identifying a threshold number of queued jobs.

5. The method of claim 1, wherein the metadata includes at least one of an aggregate CPU performance; an available number of CPUs; an available maximum memory; an available maximum disk space; an aggregate disk performance; an aggregate network bandwidth; a base operating system; a maximum cost for IaaS provisioned hardware; a geographic location of physical hardware; a scheduling system queue and a jurisdiction of physical hardware.

6. The method of claim 1, wherein the metadata associated with the at least one queued job is supplied along with the at least one queued job.

7. The method of claim 1, wherein the metadata associated with the at least one queued job is stored in advance.

8. A computer system comprising:
one or more processors; and
one or more computer readable media having stored thereon computer-executable instructions that are executable by the one or more processors to cause the computer system to optimize provisioning of virtual machines, the computer-executable instructions including instructions that are executable to cause the computer system to perform at least the following:
identify a plurality of jobs that are currently being processed by a virtualized compute infrastructure that includes one or more virtualized computing providers, the virtualized compute infrastructure comprising a plurality of currently provisioned virtual machines;

identify, within a queue, a plurality of jobs to be processed by the virtualized compute infrastructure;

for each of at least one of the plurality of jobs within the queue, perform at least the following:

processing metadata associated with the at least one queued job, the metadata comprising logical data describing processing requirements of the at least one queued job;

based at least partially on the processed metadata, selecting at least one virtual machine to be used for processing the at least one job, selecting the at least one virtual machine comprising at least:

analyzing configuration types of one or more available virtual machines associated with at least one of the one or more virtualized computing providers to identify each available virtual machine that meets the processing requirements of the at least one queued job, the one or more available virtual machines not currently being provisioned for processing jobs;

analyzing the plurality of currently provisioned virtual machines to identify each currently provisioned virtual machine that both meets the processing requirements of the at least one queued job and is idle or will soon be idle; and selecting the at least one virtual machine to be used for processing the at least one job from the one or more available virtual machines associated with at least one of the one or more virtualized computing providers and the currently provisioned virtual machines that meet the requirements of the at least one queued job and are idle or will soon be idle; and provision the at least one selected virtual machine for processing the at least one queued job.

9. The computer system of claim 8, wherein the metadata includes at least one of an aggregate CPU performance; an available number of CPUs; an available maximum memory; an available maximum disk space; an aggregate disk performance; an aggregate network bandwidth; a base operating system; a maximum cost for IaaS provisioned hardware; a geographic location of physical hardware; a scheduling system queue and a jurisdiction of physical hardware.

10. The computer system of claim 8, wherein the metadata associated with the at least one selected virtual machine includes minimum requirements for the at least one queued job.

11. The computer system of claim 8, wherein provisioning the at least one selected virtual machine includes creating at least one new instance.

12. The computer system of claim 8, further comprising storing a list of available virtual machine configurations.

13. The computer system of claim 8, wherein the metadata associated with the at least one queued job is supplied along with the at least one queued job.

14. The computer system of claim 8, wherein provisioning comprises ranking the one or more available virtual machines and the currently provisioned virtual machines based on the metadata associated with the at least one queued job.

15. The computer system of claim 8, wherein the metadata includes a ranking expression.

16. The computer system of claim 8, wherein the at least one selected virtual machine includes preferential requirements for the at least one queued job.

17. the computer system of claim 8, wherein the metadata associated with the at least one queued job is stored in advance.

18. A computer program product comprising one or more computer readable storage media, excluding signals, having stored thereon computer-executable instructions that are executable by one or more processors of a computer system to cause the computer system to optimize provisioning of virtual machines, the computer-executable instructions including instructions that are executable by the computer system to perform at least the following:

identify a plurality of jobs that are currently being processed by a virtualized compute infrastructure that includes one or more virtualized computing providers, the virtualized compute infrastructure comprising a plurality of currently provisioned virtual machines;

identify, within a queue, a plurality of jobs to be processed by the virtualized compute infrastructure;

for each of at least one of the plurality of jobs within the queue, perform at least the following:

processing metadata associated with the at least one queued job, the metadata comprising logical data describing processing requirements of the at least one queued job;

based at least partially on the processed metadata, selecting at least one virtual machine to be used for processing the at least one job, selecting the at least one virtual machine comprising at least:

analyzing configuration types of one or more available virtual machines associated with at least one of the one or more virtualized computing providers to identify each available virtual machine that meets the processing requirements of the at least one queued job, the one or more available virtual machines not currently being provisioned for processing jobs;

analyzing the plurality of currently provisioned virtual machines to identify each currently provisioned virtual machine that both meets the processing requirements of the at least one queued job and is idle or will soon be idle; and selecting the at least one virtual machine to be used for processing the at least one job from the one or more available virtual machines associated with at least one of the one or more virtualized computing providers and the currently provisioned virtual machines that meet the requirements of the at least one queued job and are idle or will soon be idle; and provision the at least one selected virtual machine for processing of the at least one queued job.

19. The computer program product of claim 18, further comprising storing a list of available virtual machine configurations.

20. The computer program product of claim 18, wherein the metadata includes a ranking expression.

* * * * *